United States Patent [19]
Grimm et al.

[11] Patent Number: 5,836,539
[45] Date of Patent: Nov. 17, 1998

[54] INLET GUIDE MECHANISM FOR WIRE FEEDER

[75] Inventors: Daniel N. Grimm, Mentor, Ohio; Brian L. Verrilli, Carlsbad, Calif.

[73] Assignee: The Lincoln Electric Company, Cleveland, Ohio

[21] Appl. No.: 907,973

[22] Filed: Aug. 11, 1997

[51] Int. Cl.⁶ .............................. B65H 23/00; B65H 57/00

[52] U.S. Cl. ...................... 242/615.3; 242/397; 242/566; 242/615.2; 242/157 R

[58] Field of Search ............................... 242/615.3, 397, 242/377, 566, 157 R, 615.2; 191/12.2 R; 137/355.26

[56] References Cited

U.S. PATENT DOCUMENTS

| | | | |
|---|---|---|---|
| 2,286,140 | 6/1942 | Klein et al. | 242/157 R |
| 3,401,859 | 9/1968 | Rienks et al. | 242/615.3 |
| 4,277,011 | 7/1981 | Jeter | 242/615.3 X |
| 5,090,647 | 2/1992 | Clarke | 242/615.3 X |

*Primary Examiner*—John Q. Nguyen
*Attorney, Agent, or Firm*—Vickers, Daniels & Young

[57] ABSTRACT

An inlet guide mechanism for a wire feeder used with an arc welder wherein the guide mechanism comprises: a housing with a wire guiding passageway having an entrance end and an exit end for directing welding wire to the wire feeder, a plurality of closely spaced spherical guide balls and a support structure for rotatably mounting the guide balls in a pattern circumferentially around the entrance end of the wire passageway whereby a wire entering the passageway engages the spherical surface of at least one of the guide balls.

22 Claims, 6 Drawing Sheets

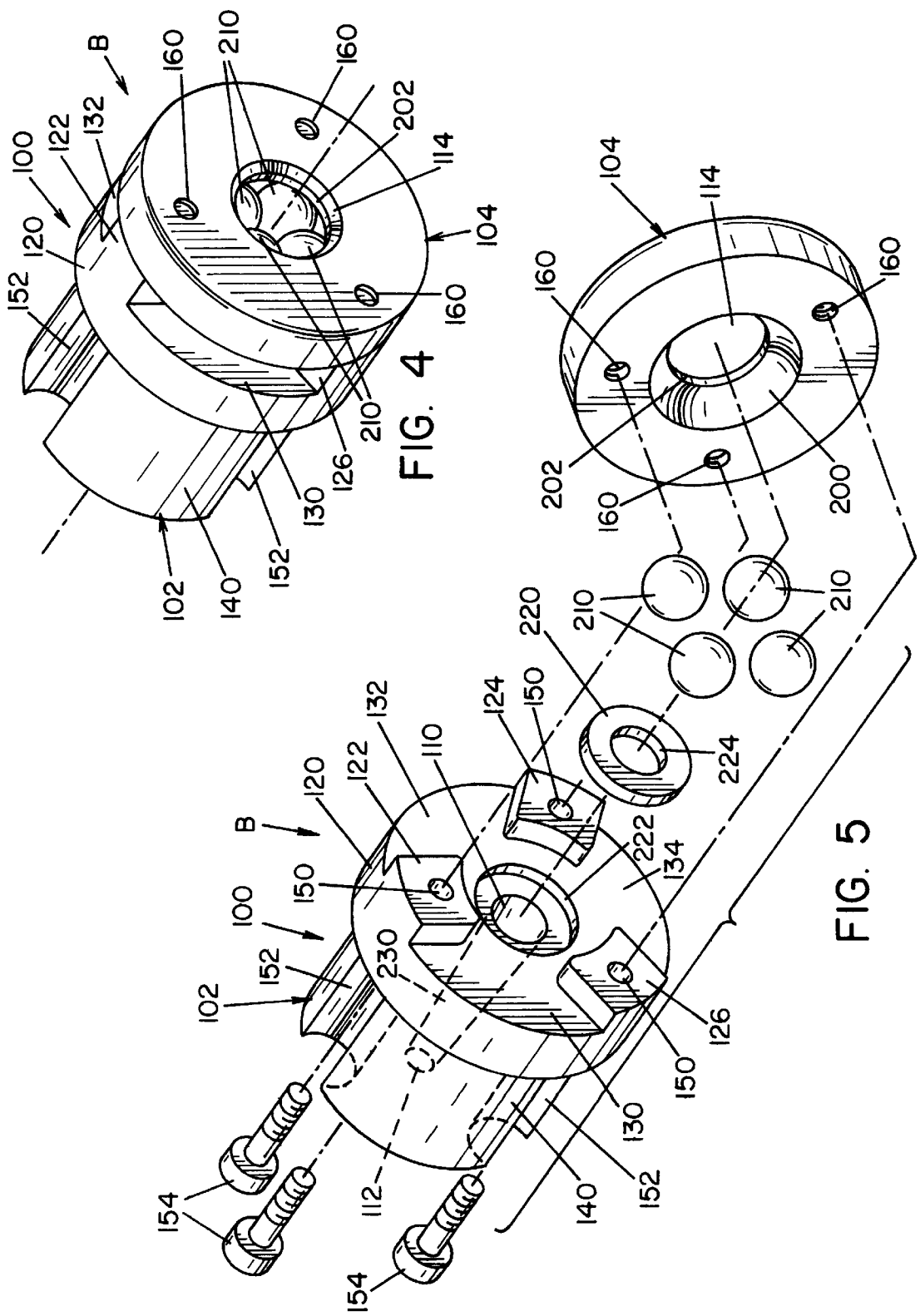

INLET GUIDE MECHANISM FOR WIRE FEEDER

The present invention relates to the art of feeding welding wire from a spool to an arc welding process and more particularly to an improved inlet guide mechanism for use with a wire feeder and a method of using this novel inlet guide mechanism.

BACKGROUND OF INVENTION

In arc welders, a two or four roll wire feeder is normally used for pulling welding wire from a storage spool and directing the wire through a guide conduit to the arc welding gun. Various types of wire feeders are employed for manual and automatic arc welding installations; however, they all require an inlet guide mechanism for directing the wire from the spool into the feeder. As the wire on the supply or storage spool decreases, the diameter of the spool decreases and the angle between the incoming wire spool and the opening or entrance end of the guide mechanism substantially increases. Consequently, the inlet guide mechanism has a tendency to cause wear and peel on the surface of the incoming wire especially as the incoming angle becomes more acute. The shavings from the wire, caused by the increase in the incoming angle from the spool and wear on the wire caused by this increased angle have presented difficulties in the welding art. Since the guide mechanism is a fixed member, the wire engages the same small area and creates a narrow kerf that causes still more drastic wire damage. To overcome these disadvantages, the inlet guide mechanism for a wire feeder has been provided with a beveled surface or a bell mouth or flared surface to accommodate increases in the intersection angle between the incoming wire and the guide mechanism. In some instances, the bell mouth concept has been used with a plastic insert forming the inlet side of the wire guide mechanism preparatory to directing the wire into the wire feeder. All of these efforts to correct the problems associated with increasing the angle of the incoming wire, still allowed wire to wear the guide mechanism and still caused surface damage to the incoming wire. These guide mechanisms used to alleviate the problem of the increased income angle of the wire have required replacement after only a short time and constant maintenance to assure that the mechanism would not cause a clogging of the passageway in the feeder. Such clogging often required disassembly of the feeder mechanism and manual cleaning of the tubes associated with the wire feeder. These corrective operations are time consuming and labor intensive. Disadvantages associated with the increased angle for the incoming wire as the spool decreases in diameter still plague the welding industry.

THE PRESENT INVENTION

The present invention relates to an improved inlet guide mechanism for directing a welding wire from a storage or supply spool to a standard wire feeder of an arc welder, which mechanism does not cause surface damage to the incoming wire as the wire angle increases and does not require replacement after a very short time, even when the novel mechanism is used in automatic welding installations. Frequent replacement of inlet guide mechanisms is the problem which especially plagues the use of plastic bell mouth guide mechanisms. A guide mechanism with a plastic inlet requires replacement under normal circumstances each month or two due to rapid wear of the plastic.

In accordance with the present invention, the entrance end of the guide mechanism is provided with a plurality of closely spaced, spherical balls surrounding the wire passageway. These balls are arranged like a ball bearing and are normally hardened stainless steel. A race in a cap forces the balls against a rear thrust ring so that the incoming wire may rotate the balls by engaging the spherical surfaces of one or more of the balls as the wire passes through the guide mechanism. These balls have long life and will cause no surface scuffing or damage to the incoming wire, irrespective of the angle caused by diameter changes in the supply or storage spool.

The invention involves an inlet guide mechanism for a wire feeder used with an arc welder, either manual or automatic, wherein the guide mechanism comprises a housing with a central wire passageway having an entrance end and an exit end for directing the welding wire to a standard wire feeder. A plurality of closely spaced, spherical guide balls are provided with a support means for mounting these guide balls in a pattern circumferentially around the entrance end of the passageway, whereby the wire entering the passageway engages the spherical surface of at least one of the guide balls and actually two adjacent balls. This inlet mechanism and the method of using this inlet mechanism overcomes the problems associated with inlet guide mechanisms heretofore used in the arc welding industry.

In accordance with another aspect of the present invention, the housing includes a thrust ring behind the guide balls and engaging the guide balls which are held in place by a cap having a bearing. The balls have only a slight spacing as used in a ball bearing which spacing is less than about 0.005 inches. Consequently, the balls rotate like a ball bearing in a pattern surrounding the wire. As the wire moves over the balls toward the exit end of the housing preparatory to use in a wire feeder the wire engages and rotates the balls until the wire assumes a natural position between two adjacent balls.

In accordance with another aspect of the invention, the housing has access openings intersecting the wire passageway of the housing so any accumulated debris can drop from the housing. Thus, dirt will not be carried through the housing into the tube or passageways of the wire feeder. These access openings are at the rear side of the guide balls and forward of the thrust ring so debris can drop from the ball area of the guide mechanism in front of the thrust ring.

In accordance with another aspect of the present invention, the thrust ring and balls are formed from hardened stainless steel to reduce any tendency to cause corrosion. In addition, ceramic balls or plastic balls are used in the present invention.

The primary object of the present invention is the provision of an inlet guide mechanism for a wire feeder of an arc welder, which guide mechanism can accommodate increased incoming angles of the wire from a storage spool, without damage to the incoming wire or rapid wear to the guide mechanism itself.

Yet another object of the present invention is the provision of a guide mechanism for a wire feeder, as defined above, which guide mechanism employs a plurality of circumferentially positioned spherical balls similar to a ball bearing, which balls surround the passageway of the guide mechanism at the entrance end thereof whereby the incoming wire engages the spherical surface of one or more of the balls. The balls are closely spaced so that the wire is not be pulled between two adjacent balls. The balls can rotate to align two adjacent balls on opposite sides of the wire.

Still a further object of the present invention is the provision of a guide mechanism for a wire feeder to be used in an arc welder, which guide mechanism has a long life, causes reduced down time and substantially reduces labor costs associated with maintenance of the wire feeder. Since the wire feeders are often used in the field by individual operators, the provision of a guide mechanism which need not be replaced often substantially increases the satisfaction of the customer and enhances the reputation of the manufacturer.

Another object of the present invention is the provision of a method of using a novel guide mechanism having a plurality of closely spaced spherical balls surrounding the entrance end of the wire passageway of a guide mechanism.

These and other objects and advantages will become apparent from the following description taken together with the accompanying drawings.

BRIEF DESCRIPTION OF THE DRAWINGS

FIG. 4 is a pictorial view of the preferred embodiment of the present invention;

FIG. 5 is an exploded, isometric view of the preferred embodiment of the present invention as shown in FIG. 4;

PREFERRED EMBODIMENT

Figure 1:
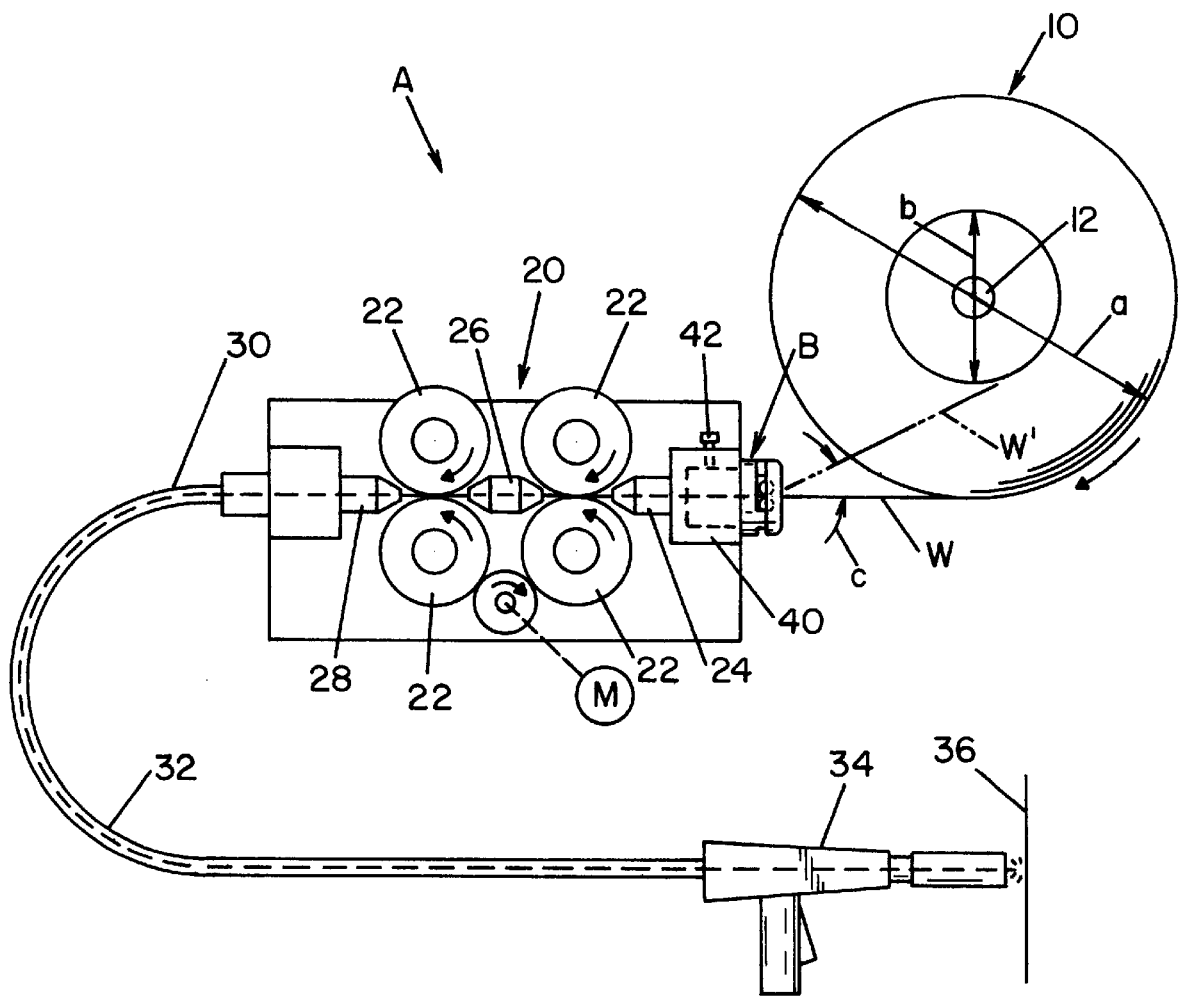
FIG. 1 is a schematic, side elevational view of an arc welding installation utilizing the improved guide mechanism of the present invention.

Referring now to the drawings wherein the showings are for the purpose of illustrating the preferred embodiment of the invention only and not for the purpose of limiting same, FIG. 1 schematically shows a somewhat standard arc welder A having a supply or storage spool 10 with a central rotatable hub 12 for directing welding wire W to wire feeder 20. The feeder may have a variety of structures and is illustrated as including four drive or feed wheels 22 with axially aligned guide tubes 24, 26 and 28. These tubes have central passageways through which the wire from spool 10 is pulled and directed to an outlet guide mechanism 30 communicated with wire guide tube 32. The guide tube directs wire W to welding gun 34 for arc welding workpiece 36. Wire feeder 20, in practice, may be a wire feeder as illustrated with guide tubes 24, 26 and 28 or a wire feeder having two plates with a machined groove corresponding to the wire openings through tubes 24, 26 and 28. The type of wire feeder is not part of the present invention and a common four wheel wire feeder is illustrated. The present invention involves an improved inlet guide mechanism B supported at the inlet end of feeder 20 and locked in mounting block 40 by set screw 42. Details of the improved inlet guide mechanism are illustrated in FIGS. 4–11.

Figure 2:
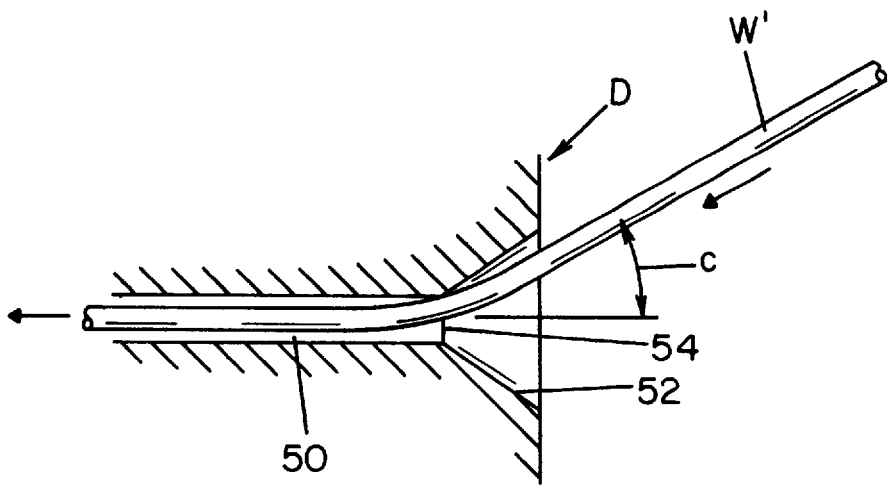
FIGS. 2 and 3 are schematic, partially cross sectioned views showing the entrance end of the wire passageway as modified in the prior art to reduce the effect caused by increased intersecting angles for the incoming wire.
Figure 3:
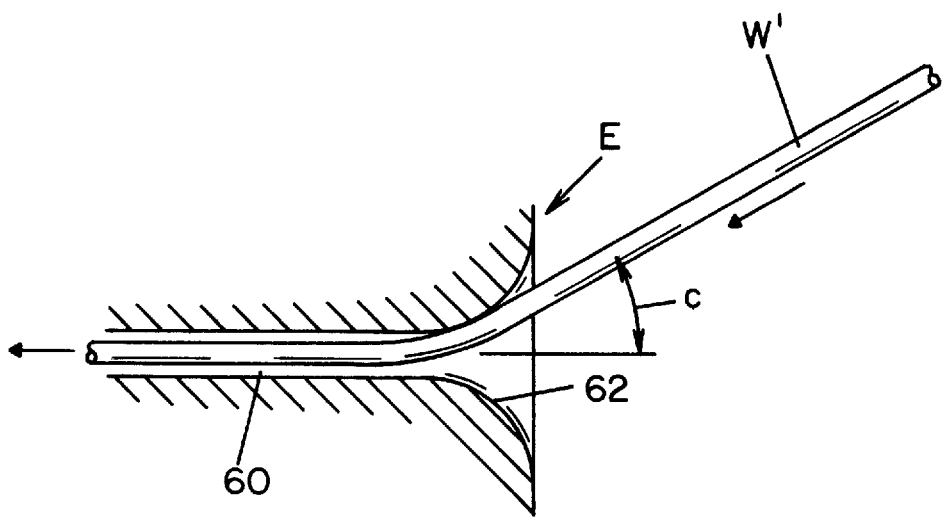
Figure 6:
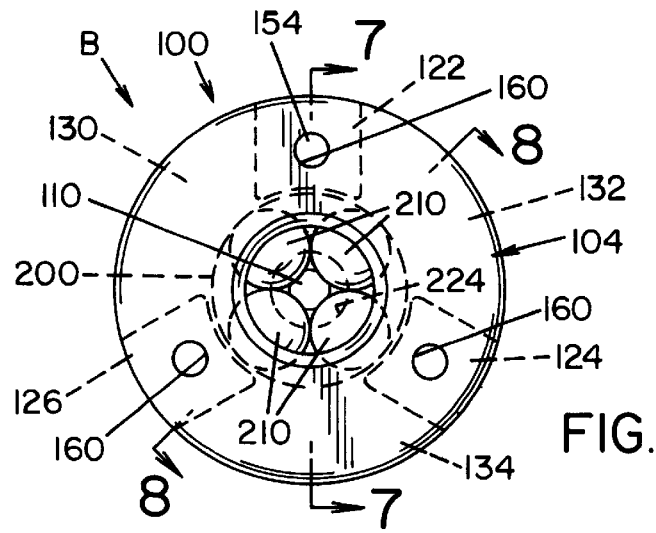
FIG. 6 is a front view of the preferred embodiment of the present invention.
Figure 7:
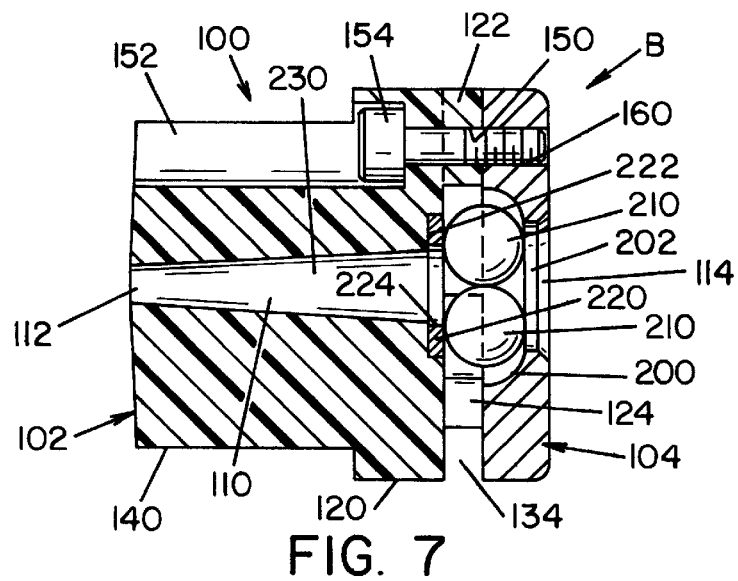
FIG. 7 is a cross sectional view taken generally along lines 7—7 of FIG. 6.
Figure 8:
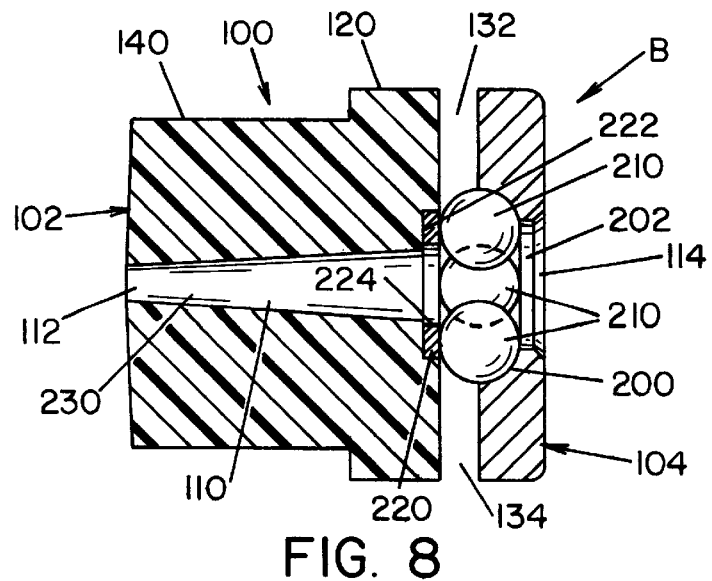
FIG. 8 is a cross sectional view taken generally along line 8—8 of FIG. 6.
Figure 9:
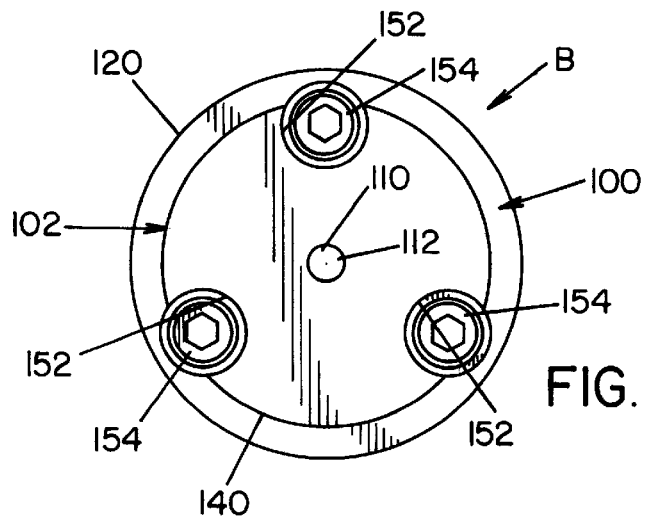
FIG. 9 is a rear view of the preferred embodiment as shown in FIGS. 4—8.

When first loaded onto arc welder A, spool 10 is full and is normally mounted so the wire is aligned with guide mechanism B. Wire W has a diameter a, which diameter allows wire W to move directly into inlet guide mechanism B without an intersecting angle; however, as wire on the spool 10 is used in the welding operation, the diameter of the spool decreases as represented by diameter b, so that the wire W' enters inlet guide mechanism B at an angle represented by angle c. As angle c increased, more wear was caused in prior art inlet guide mechanisms, as is disclosed in FIGS. 2 and 3. Prior art inlet guide mechanism D included wire passageway 50 having a beveled entrance end 52. As wire W' is directed into passageway 50 through inlet 52 at angle c, the wire is scuffed or shaved at the intersection 54 between passageway 50 and beveled entrance end 52. This shaving action caused clogging of the tubes 24, 26 and 28 and otherwise hampered the smooth operation of arc welder A. To solve the problems associated with the use of a beveled entrance end, another prior art inlet guide mechanism E was developed. It was formed from either steel, brass or plastic. Guide mechanism E included a wire passageway 60 and a bell mouthed entrance end 62. As wire W' entered guide mechanism E at angle c, there was a tendency of the wire to wear the surface of the bell mouth entrance end 62. This guide mechanism E is fixed with respect to feeder 20, wire W' continuously engaged the same small area of the entrance end 62 causing rapid wear of that area. This wear was more pronounced when a plastic material was employed for prior art inlet guide mechanism E. This same concentrated wear characteristic was associated with guide mechanism D shown in FIG. 2 and other inlet guide mechanisms of the prior art. Since the wire W of spool 10 varies in diameter in the general range of 0.023 to 0.125 inches in diameter, the wire engaging a specific surface of guide mechanism D or guide mechanism E had a tendency to cut the surface and rapidly create a kerf that caused increased shaving and scuffing and required immediate operator attention. Wire angle c also occurs with misalignment between the coil or spool payout point and incoming guide mechanism B in a direction along the spool axis. As the spool or coil unwinds, the wire payout point moves from side to side as each layer is unwound.

The preferred embodiment of the present invention is illustrated in FIGS. 4–9 wherein inlet guide mechanism B includes housing 100 with a rear plastic body portion 102 and a forward stainless steel cap 104. Centrally disposed in housing 100 is wire passageway 110 having an exit end 112 at the back of body portion 102 and an entrance end 114 at the stainless steel cap 104. Plastic body portion 102 has a forward collar 120 with three outwardly protruding lugs 122, 124 and 126 and recessed openings 130, 132 and 134 for the purpose of cleaning and allowing debris to fall from guide mechanism B' should such debris be formed. Thus, dirt does not enter body portion 102. Collar 120 also includes a plurality of bolt clearance holes 150 and rearwardly facing cylindrical clearance bores 152 to accommodate bolts 154 used to fixedly secure body portion 102 and stainless steel cap 104. Bolts 154 pass through holes 150 and are received in threaded holes 160 of cap 104 so that the bolts draw cap 104 against lugs 122, 124 and 126 for the purpose of assembling guide mechanism B. The inventive aspect of guide mechanism B is the use of a ball bearing type structure at entrance end 114. This ball bearing structure includes bearing race 200 in the rear of cap 104 that terminates in a forwardly facing large opening 202 that does not engage wire W as it passes into guide mechanism B. In a fashion similar to a ball bearing, race 200 at the back of cap 104 captures and holds a plurality of stainless steel spherical guide balls 210, four of which are used in the preferred embodiment of the present invention. These balls are held closely together with a slight spacing such as less than about 0.005 inches in a fashion similar to a ball bearing and they can rotate to align with the incoming wire W. Race 200 holds balls 210 in close proximity to a stainless steel thrust ring or bearing 220 mounted in recess 222 of plastic body portion 102. Central opening 224 is larger than conical wire passageway area 230 defining wire passageway 110 in plastic body portion 102. When cap 104 is pulled into tight relationship with lugs 122, 124 and 126, race 200 holds balls 210 in a manner circumferentially surrounding the wire passageway and defining the wire engaging inlet structure of guide mechanism B.

Figure 10:
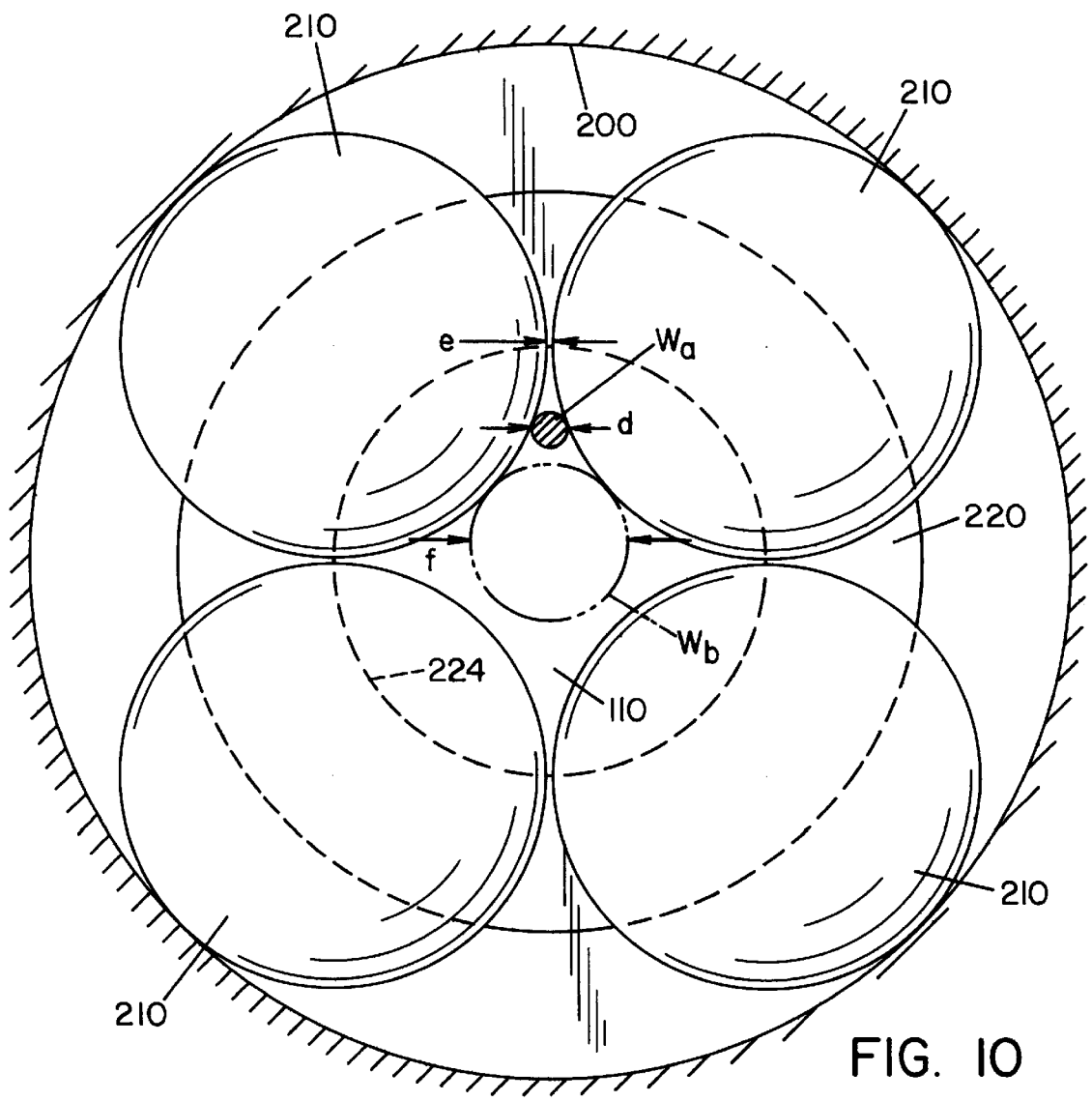
FIG. 10 is an enlarged view of the entrance end of the guide mechanism constructed in accordance with the present invention showing the spherical balls mounted as a ball bearing construction surrounding the wire passageway with gradations in the size of the incoming wire schematically illustrated to compare with the slight spacing of the balls.
Figure 11:
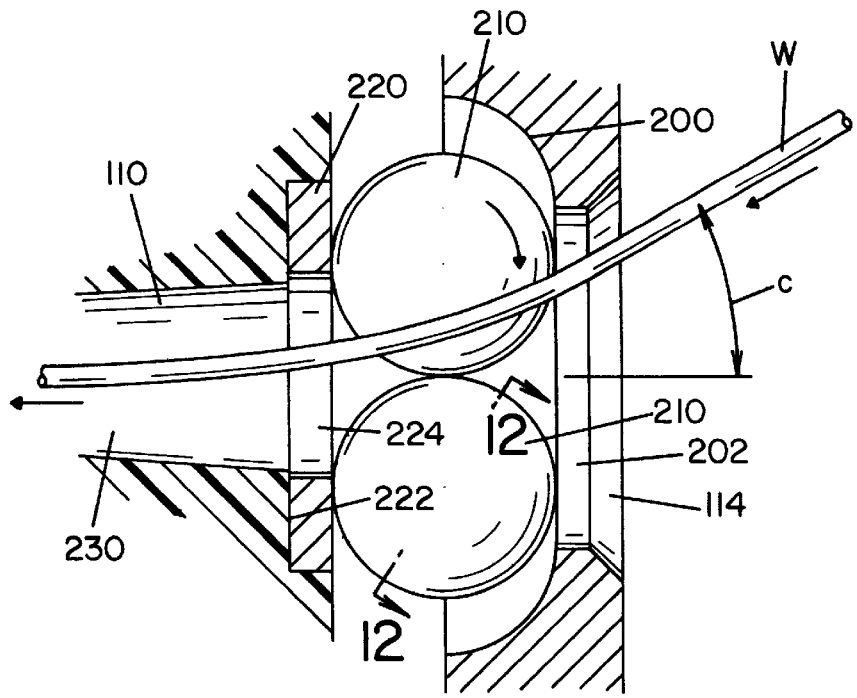
FIG. 11 is an enlarged, partial view showing in cross section operating characteristics of the preferred embodiment of the present invention.

Referring now to FIGS. 10 and 11, operating characteristics of the present invention illustrated in FIGS. 4–9 are schematically represented. In FIG. 10, a small wire $W_a$ has a diameter b and has shifted balls 210 until two balls engage the wire as it moves in a straight line through mechanism B. Diameter b is substantially greater than the slight small opening or spacing e between spherical balls 210. These balls are merely spaced with respect to each other so that they may rotate in race 200 against thrust bearing or ring 220. Balls 210 can rotate. Thus, the same surface of the balls are not always engaged with the incoming wire. The balls rotate to be aligned with the wire W. Thrust ring 220 prevents wear on the surface of plastic body portion 102 caused by the rotating balls. Larger wire, shown in phantom lines as wire $W_b$, has a diameter f which will engage a different portion of the balls as shown in FIG. 10. The incoming wire does not continue to engage and cut into the same surface of guide mechanism B as done in the prior art mechanisms D and E shown in FIGS. 2 and 3, respectively. In FIG. 11, as the wire angle increases, wire W merely wraps around the spherical surfaces of the balls to prevent any rapid wear of the guide mechanism B. In practice, the wire assumes the position between two adjacent balls as shown in FIG. 10 and the balls rotate to accommodate this position of the wire.

Figure 12:
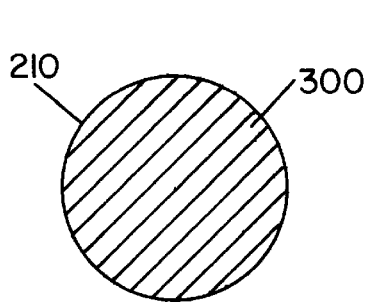
FIG. 12 is a cross-sectional view of a preferred guide ball of the present invention taken along line 12—12 of FIG. 11.
Figure 13:
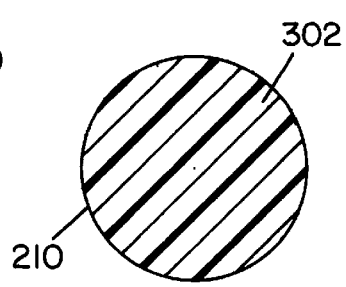
FIG. 13 is a cross-sectional view similar to FIG. 12 and showing another embodiment of a guide ball in accordance with the present invention; and, FIG. 14 is a cross-sectional view similar to FIG. 12 and showing yet another embodiment of a guide ball in accordance with the present invention.
Figure 14:
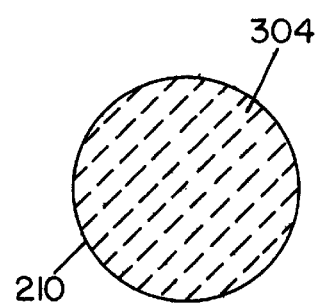

In FIG. 12, ball 210 is shown in cross section. In the preferred embodiment, balls 210 are formed from hardened stainless steel 300. In another embodiment, balls 210 are formed from plastic 302 as shown in FIG. 13. In yet another embodiment, balls 210 are formed from ceramic material 304 as shown in FIG. 14.

We claim:

1. An inlet guide mechanism for a wire feeder used with an arc welder, said guide mechanism comprising: a housing with a wire guiding passageway having an entrance end and an exit end for directing welding wire to said wire feeder, a plurality of spherical guide balls, and support means for mounting said balls in a pattern circumferentially around said entrance end of said passageway and supporting said balls for annular rotation circumferentially around said entrance end, said pattern providing for a wire entering said passageway to engage the spherical surface of at least one of said guide balls.

2. An inlet guide mechanism as defined in claim 1 including a thrust ring between said guide balls and said exit end and engaged by said guide balls, said ring surrounding said wire passageway.

3. An inlet guide mechanism as defined in claim 2 wherein said thrust ring is formed from hardened stainless steel.

4. An inlet guide mechanism as defined in claim 3 wherein said balls are respectively supported for rotation about the centers of the guide balls by said support means.

5. An inlet guide mechanism as defined in claim 2 wherein said support means holds said balls in close proximity to said thrust ring.

6. An inlet guide mechanism as defined in claim 2 wherein said balls are respectively supported for rotation about the centers of the guide balls by said support means.

7. An inlet guide mechanism as defined in claim 2 including laterally extending access openings in said housing, said access openings and intersecting said passageway adjacent said balls.

8. An inlet guide mechanism as defined in claim 2 wherein said housing includes a rearward body portion and a forward cap forming a part of said support means, said cap having an opening at said entrance end exposing said balls and a bearing race directed toward said exit end for rotatably holding said spherical guide balls.

9. An inlet guide mechanism as defined in claim 8 wherein said cap includes fasteners for mounting said cap on said body portion for holding said balls in close proximity to said thrust ring.

10. An inlet guide mechanism as defined in claim 9 including laterally extending access openings in said housing, said access openings intersecting said passageway adjacent said balls.

11. An inlet as defined in claim 10 wherein said access openings are slots in said body portion forward of said thrust ring.

12. An inlet guide mechanism as defined in claim 1 wherein said balls are spaced from each other a distance of less than about 0.005 inches.

13. An inlet guide mechanism as defined in claim 1 wherein said guide balls are respectively supported for rotation about the centers of the guide balls by said support means.

14. An inlet guide mechanism as defined in claim 1 including laterally extending access openings in said housing, said access openings intersecting said passageway adjacent said balls.

15. An inlet guide mechanism as defined in claim 1 wherein said housing includes a rearward body portion and a forward cap forming a part of said support means, said cap having an opening at said entrance end exposing said balls and a bearing race directed toward said exit end for rotatably holding said spherical guide balls.

16. An inlet guide mechanism as defined in claim 15 including laterally extending access openings in said housing, said access openings intersecting said passageway adjacent said balls.

17. An inlet as defined in claim 16 wherein said access openings are slots in said body portion forward of said thrust ring.

18. An inlet guide mechanism as defined in claim 1 wherein said guide balls are formed from ceramic material.

19. An inlet guide mechanism as defined in claim 1 wherein said guide balls are formed from plastic material.

20. An inlet guide mechanism as defined in claim 1 wherein said guide balls are formed from hardened stainless steel.

21. A method for guiding a wire from a wire spool to a wire feeder of an arc welder, said method comprises the steps of:

(a) directing said wire through a wire passageway having an entrance end;

(b) providing said entrance end of said passageway with a plurality of closely spaced spherical balls surrounding said passageway and supported for annular rotation circumferentially around said entrance end of said passageway; and, (c) allowing said wire to engage at least one of said balls as it enters said passageway.

22. A method as defined in claim 21 wherein said wire engages and rotates said balls until the wire assumes a natural position between two adjacent balls.

* * * * *